A
United States Patent Office 2,997,497
Patented Aug. 22, 1961

2,997,497
ORGANO-SILICON PEROXIDES AND THEIR PREPARATION
Herbert Jenkner, Hannover-Wulfel, Germany, assignor to Kali-Chemie Aktiengesellschaft, Hannover, Germany
No Drawing. Filed June 7, 1956, Ser. No. 589,875
Claims priority, application Germany June 10, 1955
15 Claims. (Cl. 260—448.8)

The invention relates to organosilicon peroxides.

It is known to prepare arylsilicon peroxides by reacting triarylchlorosilanes or triarylsilanols with high concentrated hydrogen peroxide in a homogeneous system. However, this known method allows of obtaining organosilicon peroxides, such as di(triarylsilyl) peroxides and triarylsilyl hydroperoxides, only in low yields.

According to another known method, di(triorgano)silyl peroxides are prepared by reaction of alkali metal triorgano silanolates with chlorine or bromine.

It is a principal object of the invention to provide a novel and convenient method of preparing organosilicon peroxides in high yields.

It is another object of the invention to provide new organosilicon peroxides and a method for their preparation.

Other objects and advantages will be apparent from a consideration of the specification and claims.

I have found that silicon peroxides are obtained in high yields by reacting a compound of the general formula $$SiHal_xR_y(OR^1)_z$$

or a polymer thereof with a peroxide in the presence of a hydrogen halide acceptor.

In said formula, Hal represents any of the halogens, F, Cl, Br, and I, and R and $R^1$ are alkyl, aryl, or aralkyl; $x$ is an integer from 1 to 4, inclusive, and $y$ and $z$ represent each an integer from 0 to 3, whereby $x+y+z$ must always equal 4.

As representative examples of suitable compounds corresponding to the above formula, the following compounds may be cited: diethyldifluorosilane, triethoxyfluorosilane, ethyltrifluorosilane, silicon tetrafluoride, trimethylchlorosilane, dimethyldichlorosilane, triethylchlorosilane, ethyltrichlorosilane, triethoxychlorosilane, diethoxydichlorosilane, ethoxytrichlorosilane, triphenylchlorosilane, ditolylchlorosilane, naphthyltrifluosilane, dicyclohexyldichlorosilane, tribenzylchlorosilane, ethylvinyldichlorosilane, dichlorohexamethyltrisiloxane, ethylisobutylbenzylchlorosilane, pentamethylenesilyldichloride, and others.

Suitable hydrogen halide acceptors are ammonia or organic bases, such as amines, for example mono- or dimethylamine, pyridine, and like compounds which immediately precipitate the hydrogen halide split off during the reaction as a salt, which is readily removed from the reaction mixture.

As peroxides, not only inorganic peroxides such as hydrogen peroxide, may be used, but particularly organic hydroperoxides, such as t-butylhydroperoxide, acetyl hydroperoxide, or hydroperoxides containing several hydroperoxide groups; examples of such compounds include methyl ethyl keto hydroperoxide, dicyclohexyl hydroperoxide—2, dicyclohexyl hydroperoxide—3. Also salts of organic peroxides may be employed, for instance the sodium salt of tert. butyl hydroperoxide or the disodium salt of dicyclohexyl hydroperoxide—3. It is, of course, also possible to use mixtures of the recited peroxide compounds.

In view of the wide range of different organohalogen silanes and organic peroxides suitable for the reaction, the method allows of preparing a wide variety of silylorganoperoxides suitable for the reaction, the method allows of preparing a wide variety of silylorganoperoxides and particularly novel compounds containing one or more —Si—O—O—C— groups in the molecule, such as diethylsilylditertiary butyl peroxide $$(CH_3)_3COOSi(C_2H_5)_2OOC(CH_3)_3$$

triethoxysilyl tertiary butyl peroxide $$(CH_3)_3COOSi(OC_2H_5)_3$$

and the like.

The reaction proceeds with particular ease in solvents which are not affected by peroxides; examples of such solvents are aliphatic or aromatic hydrocarbons, such as benzene, benzine, methylene chloride, difluodichloromethane, propane, acetonitrile, dimethyl formamide, and others.

The organosilicon peroxides and their polymers may be used as curing catalysts in the manufacture of silicone rubbers and are quite generally useful in many reactions where conventional organic peroxides have been employed heretofore.

The following examples are given to illustrate the practice of the invention, it being understood that they are not intended to limit the invention in any way. All parts are given by weight unless otherwise stated.

Though the foregoing examples have been carried out only with the readily available chloro and fluoro silicon compounds, similar tests have shown that the corresponding bromo and iodo compounds react in the same manner.

Example 1

A solution of 110 parts of tertiary butyl hydroperoxide in 125 parts of ether were dropped into an ammoniacal solution of 62 parts of diethyldifluorosilane in 125 parts of ether, at a temperature of —20° C. After filtering the precipitated $NH_4F$ and distilling off the ether, 132 parts of a colorless liquid were obtained. The peroxide content, calculated as $H_2O_2$, was 23.4 percent, corresponding to a content of about 91 percent of $$(CH_3)_3COOSi(C_2H_5)_2OOC(CH_3)_3$$

Example 2

36.4 parts of triethoxyfluorosilane and 19.8 parts of tertiary butylhydroperoxide were dissolved in 100 parts of ether, and ammonia was introduced until the solution was saturated at 0° C. After filtering the precipitate and distilling off the solvent, a liquid containing 13.58 percent of peroxide, calculated as $H_2O_2$, was obtained in a yield of 60 percent. The product was almost pure triethoxysilyl tert—butylperoxide.

Example 3

A solution of 11.4 parts of ethyltrifluorosilane and 27 parts of tert.-butylhydroperoxide in 100 parts of ether was treated with ammonia as set forth in Example 2. There were obtained 35 parts of a colorless oil with a peroxide content of 20 percent, calculated as $H_2O_2$.

Example 4

A solution of 25 parts of diethyldifluorosilane and 5.75 parts of 100% $H_2O_2$ in 65 parts of ether was treated with anhydrous ammonia until no more ammonia was retained. There were obtained 11.2 parts of a precipitate consisting of $NH_4F$ and $(NH_4)_2SiF_6$. The ether solution was freed from ether in high vacuo, whereby a colorless liquid remained, which had a peroxide content of 11.8 percent, calculated as $H_2O_2$. In addition, the silicone oil contained still 22.3 percent of ethoxy, so that 33 percent of the initial peroxide had been used for the formation of silicon peroxides, and the remainder for the oxidation of SiR to SiOR.

If dimethyldifluorosilane was used instead of diethyldifluorosilane, approximately the same result was obtained.

*Example 5*

SiF$_4$ and NH$_3$ were passed simultaneously at —20° C. into a solution of 46.7 parts of tert.-butylhydroperoxide in 390 parts of ether. The total amount of SiF$_4$ used was 13.5 parts; ammonia was employed in an excess. The reaction mixture was filtered, whereby 18.5 parts (=96.3 percent of theory) of a precipitate were obtained, which consisted essentially of NH$_4$F. The filtrate was freed in vacuo from ether; the residue was 49 parts (=98.4 percent of theory) of an oil having a peroxide content, calculated as H$_2$O$_2$, of 27 percent. The pure compound Si(OOC(CH$_3$)$_3$)$_4$ would require 35.4 percent of peroxide.

*Example 6*

A mixture of 21.7 parts of trimethylchlorosilane and 18 parts of tert.-butylhydroperoxide (about 95%) dissolved in 50 parts of ether was treated with anhydrous ammonia at —20° C. until no more ammonia was taken up. After filtering off 10.5 parts of ammonium chloride and distilling off the ether in vacuo at a temperature between —20 and —30° C., 30.3 parts (=95 percent of theory) of a product were obtained, which consisted substantially of trimethylsilyl tert.-butylperoxide. A peroxide content of 20 percent, calculated as H$_2$O$_2$, was found, corresponding to a content of 95 percent of trimethylsilyl-t-butylperoxide. Therefore, the reaction had proceeded according to the equation

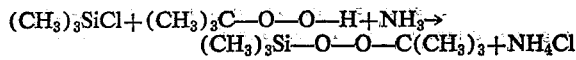

*Example 7*

According to the equation

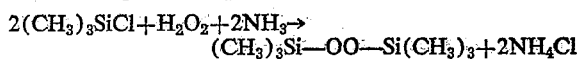

a mixture of 21.7 parts of trimethylchlorosilane and 3.4 parts of 100% H$_2$O$_2$ was dissolved in 50 parts of ether and treated with ammonia at a temperature of —20° C. The procedure was the same as set forth in Example 6.

The theoretical amount of ammonium chloride (10.6 parts) was precipitated, and after evaporation of the ether in high vacuo 70 percent of the theory of bis-(trimethylsilyl) peroxide were obtained. However, it was found that the ether, which had been distilled off, contained also about 25 percent of the silicon peroxide, so that the total yield was about 95 percent. The distillation residue had a peroxide content of 18 percent, calculated as H$_2$O$_2$; the pure compound would require 19.1 percent. The product decomposed at room temperature with slight development of gases, whereby the peroxide content dropped within 24 hours from 18% to 14.5%. However, at a temperature of —78° C. the silicon peroxide was stable for an extended period of time.

*Example 8*

This example was carried out in the same way as Example 7 with the sole difference that 3.78 parts of 90% H$_2$O$_2$ were used instead of 3.4 parts of 100% H$_2$O$_2$. There was obtained a silicon peroxide with a peroxide content of 14.7%, calculated as H$_2$O$_2$ (theory: 19.1%). The yield was in excess of 90 percent.

*Example 9*

Under the same conditions as set forth in Example 6, ammonia was introduced in a mixture of 12.9 parts of dimethyldichlorosilane and 18 parts of t-butylhydroperoxide in 50 parts of ether. Ammonium chloride was formed in the theoretical amount, and 23.7 parts of the silicon peroxide defined in the following equation were found, which corresponded to a yield of 100%. The reaction proceeded in accordance with the equation

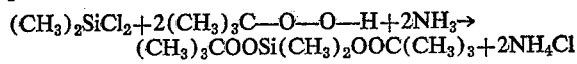

The peroxide content of the liquid reaction product, calculates as H$_2$O$_2$, was 27% (theory: 28.8%).

*Example 10*

A mixture of 12.9 parts of dimethyldichlorosilane and 3.4 parts of 100% H$_2$O$_2$ in 50 parts of ether was treated with ammonia, as described in Example 6. The reaction proceeded with strong development of heat. 11.7 parts of a solid residue were obtained, compared with 10.7 parts required by the theory. The residue consisted substantially of ammonium chloride, but it contained also .7 percent of SiO$_2$ and 1.65 percent of peroxide as hydrogen peroxide equivalent. After removing the precipitate by filtration, the ether was distilled off in high vacuo, whereby 10.2 parts of a silicon peroxide remained (instead of 9 parts required by theory). Instead of the theoretical amount of 37.8% of H$_2$O$_2$, the product contained 11.25% but 17.17% of methoxy was found as oxidation product of H$_2$O$_2$. 39.4% of the original H$_2$O$_2$ reappeared in the reaction products; the remainder had apparently been used up for the oxidation of SiR to SiOR.

*Example 11*

37.6 parts of triethylchlorosilane, dissolved in 140 parts of ether, were reacted with 20.25 parts of tert- butylhydroperoxide at a temperature of —20 to 0° C. with stirring and introduction of ammonia. There were obtained 12 parts (=100% of theory) of ammonium chloride, and 44.1 parts (=97.5% of theory of tert.- butyltriethyl silicon peroxide. The compound was a mobile liquid which could be distilled at a temperature of 38 to 40° C. and a pressure of .05 mm. Hg without decomposition. The peroxide content as H$_2$O$_2$ equivalent was 16% (theory: 16.6%).

*Example 12*

60.2 parts of triethylchlorosilane were dissolved in 90 parts of anhydrous ether, and a solution of 6.12 parts of 100% H$_2$O$_2$ in 90 parts of ether were added thereto at a temperature of —20° C. Subsequently, ammonia was introduced into the mixture at said temperature. There were obtained 45.3 parts of di(triethylsilyl) peroxide of the theoretic H$_2$O$_2$ content.

*Example 13*

32.7 parts of ethyltrichlorosilane and 53.2 parts of tert.- butylhydroperoxide were dissolved in 210 parts of ether and treated with ammonia at a temperature of —20 to 0° C. until no more ammonia was taken up. There were found 60 parts (=94% of theory) of the silicon peroxide having a peroxide content as hydrogen peroxide equivalent of 29.1% (theory: 31.4%).

*Example 14*

39.7 parts of triethoxychlorosilane and 18 parts of tert.- butylhydroperoxide in 140 parts of ether were reacted with ammonia as set forth in the preceding example. After removal of the ammonium chloride by filtration and distilling of the ether in vacuo, 48 parts (=96% of theory) of liquid triethoxysilyl tert. butyl peroxide were obtained. The peroxide content as hydrogen peroxide equivalent was 13.3% (theory: 13.6%). On storage, said peroxide content dropped within 3 months from 13.3 to 12.8%.

*Example 15*

28.35 parts of diethyl dichlorosilane and 27 parts of tert.- butylhydroperoxide in 175 parts of ether were treated with ammonia, as described in the preceding examples. There were obtained 42.1 parts of a liquid silicon peroxide containing 21.4 percent of peroxide as hydrogen peroxide equivalent (theory for diethylsilyl tert.-butyl peroxide=23%).

*Example 16*

18 parts of ethoxytrichlorosilane and 27 parts of tert.-butylhydroperoxide in 175 parts of ether were reacted with ammonia as set forth above. There were obtained 33 parts of a liquid silicon peroxide with an $H_2O_3$ content of 27.1% (theory for $C_2H_5OSi(OOC(CH_3)_3)_3=30\%$).

*Example 17*

10 parts of dicyclohexylhydroperoxide and 8.7 parts of trimethylchlorosilane in 90 parts of ether were reacted with anhydrous ammonia at a temperature of —30 to —10° C. There were obtained 4 parts (=97.4% of theory) of ammonium chloride, and after distillation of the ether, 15 parts of a solid colorless silicon peroxide with an $H_2O_2$ content of 25.1% (theor. $H_2O_2$ content of di(trimethylsilyl)dicyclohexylperoxide=25.2%). This compound was sensitive to impact.

*Example 18*

26.2 parts of dicyclohexyl hydroperoxide, dissolved in 100 parts of ether, and 30.1 parts of triethylchlorosilane, dissolved in 20 parts of ether, were reacted with ammonia in the manner set forth in the preceding example. 45 parts (=92% of theory) of a clear, viscous, impact sensitive silicon peroxide were obtained which had an $H_2O_2$ content of 15.2% (theory: 20.8%).

*Example 19*

26.2 parts of dicyclohexyl hydroperoxide, dissolved in 70 parts of benzene, and 12.9 parts of dimethyldichlorosilane, dissolved in 70 parts of benzene, were reacted at room temperature with anhydrous ammonia. The reaction was exothermic. 31 parts of an oily colorless dimethylsilyl dicyclohexylperoxide were obtained, which was very sensitive to impact.

*Example 20*

2.62 parts of dicyclohexyl hydroperoxide and 1.24 parts of diethyldifluorosilane were dissolved in 70 parts of benzene and reacted at room temperature with ammonia as described in Example 19. A viscous liquid was obtained, which slowly solidified on standing. The $H_2O_2$ content was 23%.

*Example 21*

The reaction of Example 20 was repeated but the diethyldifluorosilane was replaced by the corresponding amount of diethyldichlorosilane. The result was the same.

*Example 22*

47 parts of a 44.5% benzine solution ($b$=30–50° C.) of methylethylketohydroperoxide were reacted with 22 parts of trimethylchlorosilane in 100 parts of petroleum ether ($b$=30–50° C.) and anhydrous ammonia at —20° C. 36 parts (=100% of theory) of a clear liquid silicon peroxide were obtained, which was extremely sensitive to impact. The $H_2O_2$ content was 28.9% (theoretical content for di(trimethylsilyl)methylethylketoperoxide=28.8%.

*Example 23*

2.1 parts of methylethylketohydroperoxide (=4.2 parts of a 44.5% benzine solution) were reacted with 1.9 parts of dimethyldichlorosilane as set forth in Example 22. There were obtained 2.4 parts of a colorless liquid with an $H_2O_2$ content of 31% (theory=38.4%). Also this peroxide was very sensitive to impact.

*Example 24*

2.1 parts of methylethylketohydroperoxide (=4.7 parts of a 44.5% solution in benzine, $b$=60–70° C.) and 3.01 parts of triethylchlorosilane (diluted with 17 parts of benzine, $b$=30–50° C.) were reacted with ammonia at room temperature. After removal of the ammonium chloride by filtration and distilling off the benzine in vacuo, 3.8 parts (=87% of theory) of a slightly viscous peroxide were obtained. The $H_2O_2$ content was 22.8% (theory for di(triethylsilyl)methylethylketoperoxide=23.3%).

*Example 25*

A mixture of 10.9 parts of trimethylchlorosilane and 9 parts by weight of tert.-butylhydroperoxide in 100 parts by weight of ether was cooled to —20° C. and then under stirring mixed with a solution of 7.9 parts by weight of pyridine in 50 parts by weight of ether. Obtained were (after filtering off the pyridinhydrochloride and distilling off the ether) 14.4 parts by weight of trimethylsilyl-tert.-butylperoxide.

I claim:

1. A method for preparing silicon peroxides comprising reacting at temperatures between room temperature and about —30° C. a silicon halide compound of the general formula $$SiHal_xR_y(OR^1)_z$$

wherein Hal=halogen, R and $R^1$ are members of the group consisting of alkyl, aryl, and aralkyl, $x$=an integer from 1 to 4, $y$ and $z$ each=an interger between 0 and 3, and $x+y+z=4$, with a peroxide selected from the group consisting of hydrogen peroxide and organic hydroperoxides in the presence of a hydrogen halide acceptor.

2. The method as defined in claim 1, wherein the reaction is carried out in a solvent which is stable against said peroxides.

3. The method as defined in claim 1 wherein dichlorohexamethyltrisiloxane is used for the reaction.

4. The method as defined in claim 1 wherein said hydrocarbon hydroperoxide contains more than one hydroperoxide group in the molecule.

5. A method for preparing organic silicon peroxides comprising reacting a silicon halide compound of the general formula $$SiHal_xR_y(OR^1)_z$$

wherein Hal=halogen, R and $R^1$ are members of the group consisting of alkyl, aryl, and aralkyl, $x$=an integer from 1 to 4, $y$ and $z$ each =an integer between 0 and 3, and $x+y+z=4$, at a temperature of —35 to +50° C. and in the presence of ammonia with an organic hydroperoxide selected from the group consisting of tertiary butylhydroperoxide, acetyl hydroperoxide, methylethylketohydroperoxide, and dicyclohexylhydroperoxide.

6. A method for preparing organic silicon peroxides comprising providing a solution of a silicon halide compound of the general formula $$SiHal_xR_y(OR^1)_z$$

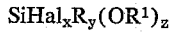

wherein Hal=halogen, R and $R^1$ are members of the group consisting of alkyl, aryl, and aralkyl, $x$=an integer from 1 to 4, $y$ and $z$ each=an integer between 0 and 3 and $x+y+z=4$, and of an organic hydroperoxide selected from the group consisting of tertiary butylhydroperoxide, acetyl hydroperoxide, methylethylketohydroperoxide, and dicyclohexylhydroperoxide, passing anhydrous ammonia into said solution at a temperature of —35 to +50° C. until the generated hydrogen halide is substantially precipitated as ammonium salt, and removing said ammonium salt and the solvent.

7. A method of preparing organic silicon tetraperoxides comprising passing a current of anhydrous ammonia and a silicon tetrahalide into a solution of an organic hydroperoxide selected from the group consisting of tertiary butylhydroperoxide, acetyl hydroperoxide, methylethylketohydroperoxide, and dicyclohexylhydroperoxide in an organic solvent at a temperature of —35 to +50° C., removing the precipitated ammonium halide, and distilling off said solvent.

8. Silicon peroxides in which at least one peroxy group attached to a carbon atom of an organic radical is bound through the peroxide oxygen to a silicon atom, the valences of said silicon atom not taken up by said peroxide groups being linked to a member of the group consisting of alkyl, aryl, and alkoxy.

9. Compounds of the formula $$Si(OOCR^2)_xR_y(OR^1)_z$$

wherein R and $R^1$ are members of the group consisting of alkyl, aryl, and aralkyl, $R^2$ the hydrocarbon residue of an organic hydroperoxide selected from the group consisting of tertiary butylhydroperoxide, acetyl hydroperoxide, methylethylketohydroperoxide, and dicyclohexylhydroperoxide bound through a peroxide oxygen to the Si atom, $x$=an integer from 1 to 4, $y$ and $z$ each=an integer between 0 and 3, and $x+y+z=4$.

10. Diethylsilyl di-t-butylperoxide of the formula $$(CH_3)_3COOSi(C_2H_5)_2OOC(CH_3)_3$$

11. Triethoxysilyl t-butylperoxide of the formula $$(C_2H_5O)_3SiOOC(CH_3)_3$$

12. $Si(OOC(CH_3)_3)_4$

13. Di (trimethylsilyl) methylethylketoperoxide as the reaction product of methylethylketohydroperoxide with trimethylchlorosilane.

14. Di (trimethylsilyl) dicyclohexylperoxide as the reaction product of dicyclohexylhydroperoxide with trimethylchlorosilane.

15. Trimethylsilyl tertiary butyl peroxide of the $$(CH_3)_3Si—O—O—C(CH_3)_3$$

References Cited in the file of this patent

UNITED STATES PATENTS 2,692,887  Berry _____ Oct. 26, 1954

OTHER REFERENCES

Jenkner: "Zietschrift fur Naturforschung," vol. 11B (1956), pp. 606 and 757.

Buncel et al.: "Chemistry and Industry," (London), No. 39, Oct. 1956, pp. 1052–53.